United States Patent
Comfort et al.

(10) Patent No.: US 8,814,258 B2
(45) Date of Patent: Aug. 26, 2014

(54) PANORAMIC VEHICLE ROOF MODULE ASSEMBLIES

(75) Inventors: Jeffrey Comfort, Saline, MI (US); Richard Howard Wykoff, Commerce Township, MI (US); Kian-Huat Tan, Westland, MI (US); Matthew John Zaluzec, Canton, MI (US); Bradley S. Bysouth, Commerce Township, MI (US); Michael Musleh, Canton, MI (US)

(73) Assignees: Ford Global Technologies, LLC, Dearborn, MI (US); Jaguar Land Rover Limited, Whitley (GB)

( * ) Notice: Subject to any disclaimer, the term of this patent is extended or adjusted under 35 U.S.C. 154(b) by 8 days.

(21) Appl. No.: 12/192,300

(22) Filed: Aug. 15, 2008

(65) Prior Publication Data

US 2010/0038932 A1 Feb. 18, 2010

(51) Int. Cl.
*B60J 7/00* (2006.01)

(52) U.S. Cl.
USPC .............................. 296/216.01; 296/216.08

(58) Field of Classification Search
USPC .................. 296/216.01, 216.03, 216.05, 214, 296/216.06–216.08, 223
See application file for complete search history.

(56) References Cited

U.S. PATENT DOCUMENTS

| | | | |
|---|---|---|---|
| 5,029,937 A * | 7/1991 | Yamamoto | 296/223 |
| 5,100,197 A * | 3/1992 | Ichinose et al. | 296/216.04 |
| 5,104,178 A | 4/1992 | Bienert | |
| 5,466,038 A | 11/1995 | Fujie et al. | |
| 5,540,478 A * | 7/1996 | Schuch | 296/210 |
| 6,129,413 A | 10/2000 | Klein | |
| 6,443,520 B1 | 9/2002 | Schmaelzle et al. | |
| 6,460,920 B1 * | 10/2002 | Reinsch | 296/216.08 |
| 6,513,865 B1 | 2/2003 | Lutz et al. | |
| 6,619,732 B2 * | 9/2003 | Radmanic | 296/216.03 |
| 6,644,728 B1 | 11/2003 | Nagashima et al. | |
| 6,817,658 B2 | 11/2004 | Ohnishi et al. | |
| 6,942,286 B2 * | 9/2005 | Bohm et al. | 296/216.05 |
| 7,073,851 B2 | 7/2006 | Seifert | |
| 7,077,462 B1 | 7/2006 | De Gaillard | |

(Continued)

FOREIGN PATENT DOCUMENTS

GB 2 428 652 A 2/2007

OTHER PUBLICATIONS

European Search Report for corresponding Application No. EP 2 154 015 A1, mailed Dec. 1, 2009, 6 pages.

(Continued)

*Primary Examiner* — Dennis H Pedder
(74) *Attorney, Agent, or Firm* — Raymond L. Coppiellie; Brooks Kushman P.C.

(57) ABSTRACT

A panoramic vehicle roof module assembly is provided with front and rear cross members. A pair of extruded side rails are each mounted to the cross members. Each side rail has a front integrated roof track, a rear integrated roof track and an integrated sun shade track, each track formed therein along its length. A roof panel is supported by one of the integrated roof tracks of the side rails to interface with the front cross members. An intermediate cross member is mounted to the side rails and is interfaced with the roof panel. A second panel is provided mounted to the side rails to interface with the rear cross member and the intermediate cross member. The side rails each include an integrated support flange to mount the assembly to a vehicle. A method of manufacturing a panoramic vehicle roof module assembly is provided.

11 Claims, 8 Drawing Sheets

(56) References Cited

U.S. PATENT DOCUMENTS

| | | | |
|---|---|---|---|
| 7,183,733 B2 | 2/2007 | Suzuki et al. | |
| 7,243,989 B2 * | 7/2007 | Manders | 296/216.03 |
| 7,367,609 B2 | 5/2008 | Grudzinski et al. | |
| 7,425,033 B2 | 9/2008 | Regnier et al. | |
| 7,625,040 B2 * | 12/2009 | Pollak et al. | 296/216.07 |
| 7,780,228 B2 | 8/2010 | Rashidy et al. | |
| 7,828,373 B2 | 11/2010 | Fernholz et al. | |
| 7,877,180 B2 | 1/2011 | Turner et al. | |
| 7,922,242 B2 | 4/2011 | Comfort et al. | |
| 7,974,755 B2 | 7/2011 | Campbell et al. | |
| 2003/0015891 A1 * | 1/2003 | Doll et al. | 296/216.08 |
| 2006/0108838 A1 * | 5/2006 | Diez Esteban et al. | 296/216.08 |
| 2009/0033128 A1 | 2/2009 | Hoelzel | |
| 2009/0088065 A1 | 4/2009 | Mouch et al. | |

OTHER PUBLICATIONS

Office Action mailed Sep. 23, 2010 in corresponding U.S. Appl. No. 12/482,526, filed Jun. 11, 2009, 6 pages.

http://www.caranddriver.com/reviews/porsche-911-targa-first-drive-review, Barry Winfield, Feb. 2002, 3 pgs.

http://www.chicagonow.com/drive-she-said/2010/10/todays-rave-vw-touareg-panoramic-sunroof, Jill Ciminillo, Oct. 27, 2010, 5 pgs.

* cited by examiner

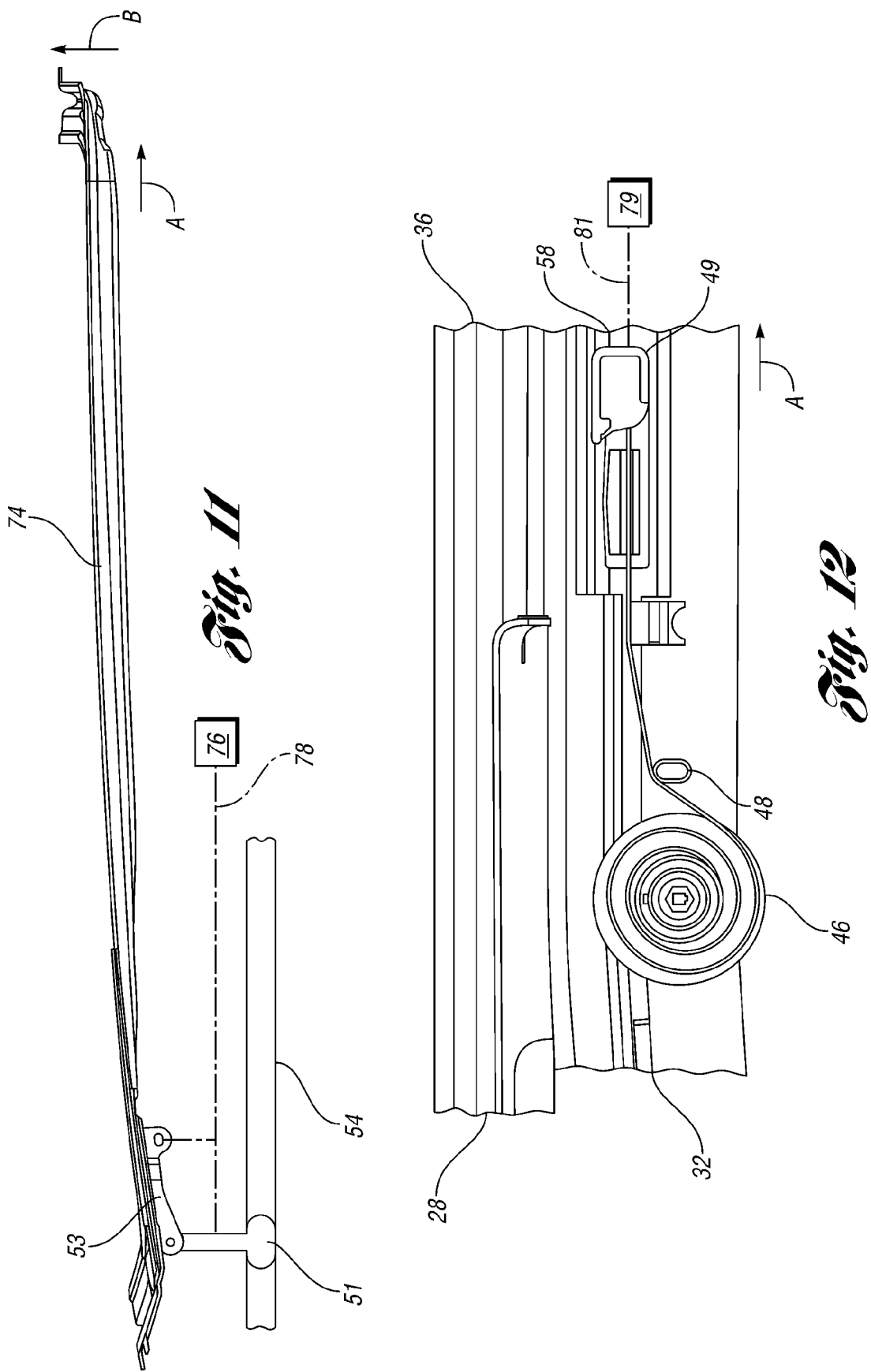

PANORAMIC VEHICLE ROOF MODULE ASSEMBLIES

BACKGROUND

1. Technical Field

Various embodiments relate to vehicle roof module assemblies.

2. Background Art

Vehicle roof assemblies are typically mounted on vehicle bodies to enclose interiors of the vehicles. Various types of roof assemblies have been employed. Conventionally, panoramic roof assemblies are employed only on specific types of vehicles and cannot be easily interchanged with other vehicles.

SUMMARY

In one embodiment, a panoramic vehicle roof module assembly is provided with a front cross member and a rear cross member. Each cross member is adapted to be mounted to a vehicle body at spaced apart locations. A first extruded side rail and a second extruded side rail, are each mounted to the front and rear cross members at spaced apart locations. Each side rail has a front integrated roof track, a rear integrated roof track and an integrated sun shade track, each track formed therein along an entire length of the side rail. A roof panel is supported by one of the integrated roof tracks of the side rails to interface with one of the cross members.

In another embodiment, a panoramic vehicle roof module assembly is provided with a front cross member that is adapted to be mounted to a vehicle body. A rear cross member is adapted to be mounted to the vehicle body spaced apart from the front cross member. A first side rail is mounted to a first end of the front cross member and to a first end of the rear cross member. The first side rail has a plurality of integrated tracks and an integrated support flange that is adapted to mount the vehicle roof module assembly to the vehicle body. Each of the tracks and the flange are provided along an entire length of the first side rail. A second side rail is mounted to a second end of the front cross member and to a second end of the rear cross member. The second side rail has a plurality of integrated tracks and an integrated support flange adapted to mount the vehicle roof module assembly to the vehicle body. Each of the tracks and the flange are provided along an entire length of the second side rail. An intermediate cross member has a first end mounted to the first side rail and a second end mounted to the second side rail between the front cross member and the rear cross member. A first generally transparent roof panel is mounted to the first side rail and the second side rail to interface with the front cross member and the intermediate cross member. A second generally transparent roof panel is mounted to the first side rail and the second side rail to interface with the rear cross member and the intermediate cross member.

In yet another embodiment, a method of manufacturing a panoramic vehicle roof module assembly is provided. A first side rail is extruded with a plurality of integrated tracks and a plurality of integrated flanges formed therein in a single extrusion. A front cross member is provided. A rear cross member is provided. The first side rail is mounted to the front cross member and the rear cross member. A second side rail is extruded with a plurality of integrated tracks and a plurality of integrated flanges formed therein in a single extrusion. The second side rail is mounted to the front cross member and the rear cross member. An intermediate cross member is provided. The intermediate cross member is mounted to the first side rail and the second side rail between the front cross member and the rear cross member. A first generally transparent roof panel is provided. The first generally transparent roof panel is mounted to the first side rail and the second side rail to interface with the front cross member and the intermediate cross member. A second generally transparent roof panel is provided. The second generally transparent roof panel is mounted to the first side rail and the second side rail to interface with the rear cross member and the intermediate cross member.

BRIEF DESCRIPTION OF THE DRAWINGS

FIG. 11 is a side elevation view of the portion of the roof module assembly of FIG. 10;

FIG. 12 is a side elevation view of an embodiment of the roof module assembly of FIG. 1;

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
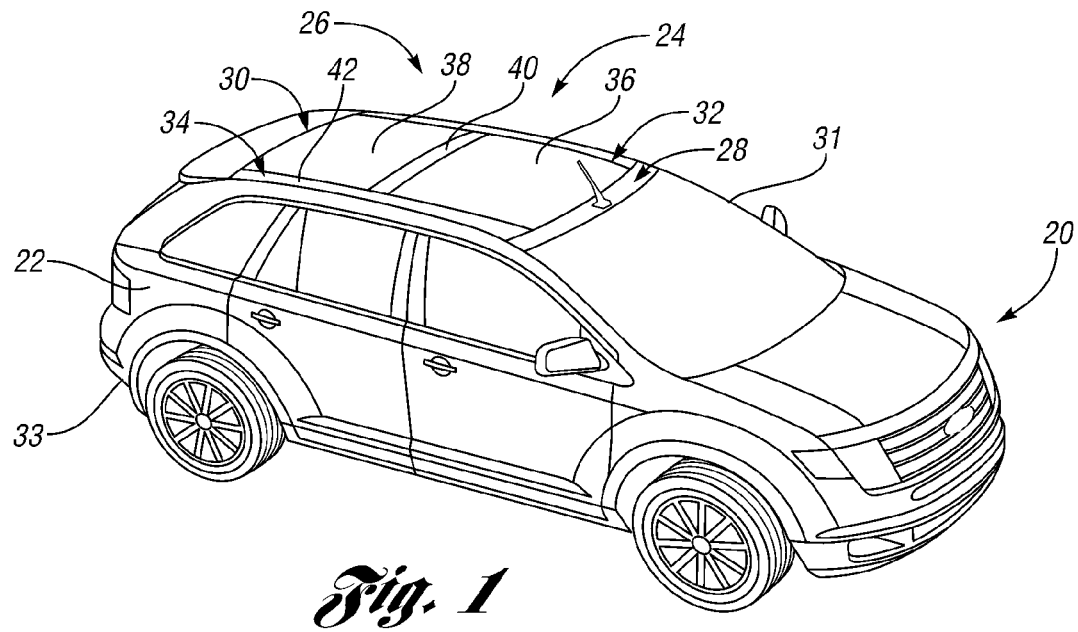
FIG. 1 is a perspective view of a roof module assembly according to an embodiment illustrated assembled to a vehicle.
Figure 2:
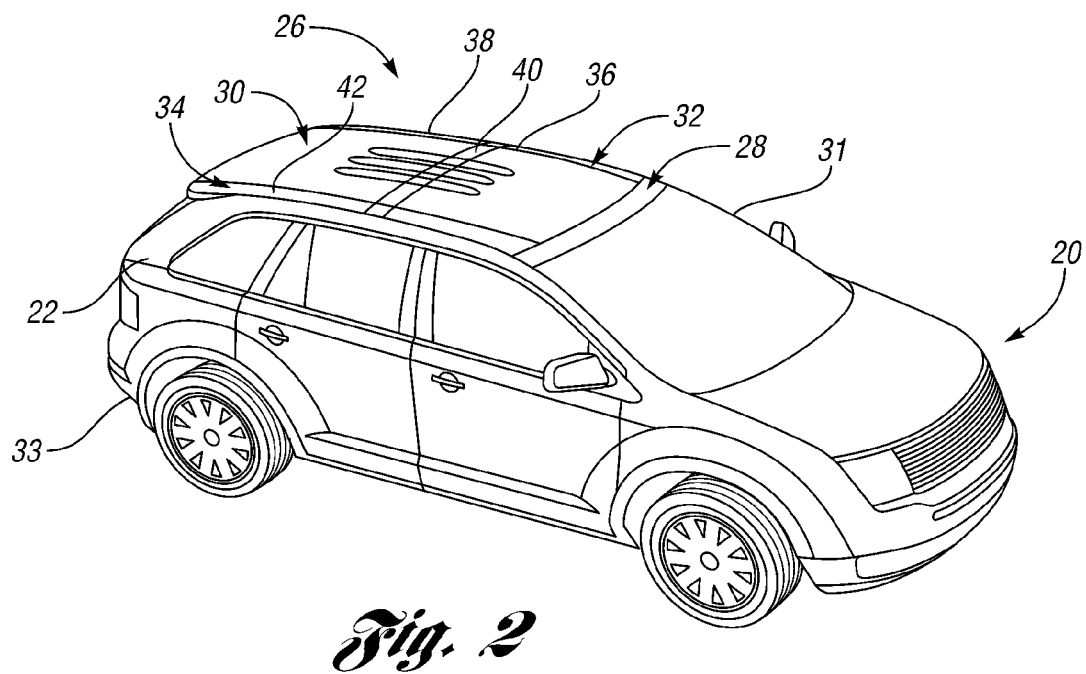
FIG. 2 a perspective view of a roof module assembly according to another embodiment illustrated assembled to a vehicle.

Referring to FIGS. 1 and 2, a passenger vehicle is illustrated and referenced generally by numeral 20. The passenger vehicle 20 has a vehicle body 22, which provides a body structure for the vehicle 20. The vehicle body 22 has a roof 26 that is formed by a roof module assembly 26 attached to the vehicle body 22.

Providing a roof assembly 26 that is modular allows the roof assembly 26 to be adapted for various vehicles 20. Components of the roof assembly 26 can easily be adapted for the vehicle 20 that the roof assembly 26 is going to be mounted on, as is discussed further below. By sharing components for the roof assembly 26 across various types of vehicles 20, production costs for each of the vehicles 20 are reduced. Additionally, tooling costs to manufacture the roof assembly 26 are decreased because the amount of tooling to manufacture various roof assemblies 26 is decreased when compared to requiring various tooling for each roof assembly of each vehicle, as is the prior art.

As illustrated, the roof module assembly 26 is panoramic because the roof module assembly 26 collectively forms the entire roof 26. In the illustrated embodiment, the panoramic roof module assembly 26 allows a complete view for an occupant from an interior of the vehicle 20 for the majority of the roof module assembly 26.

Figure 3:
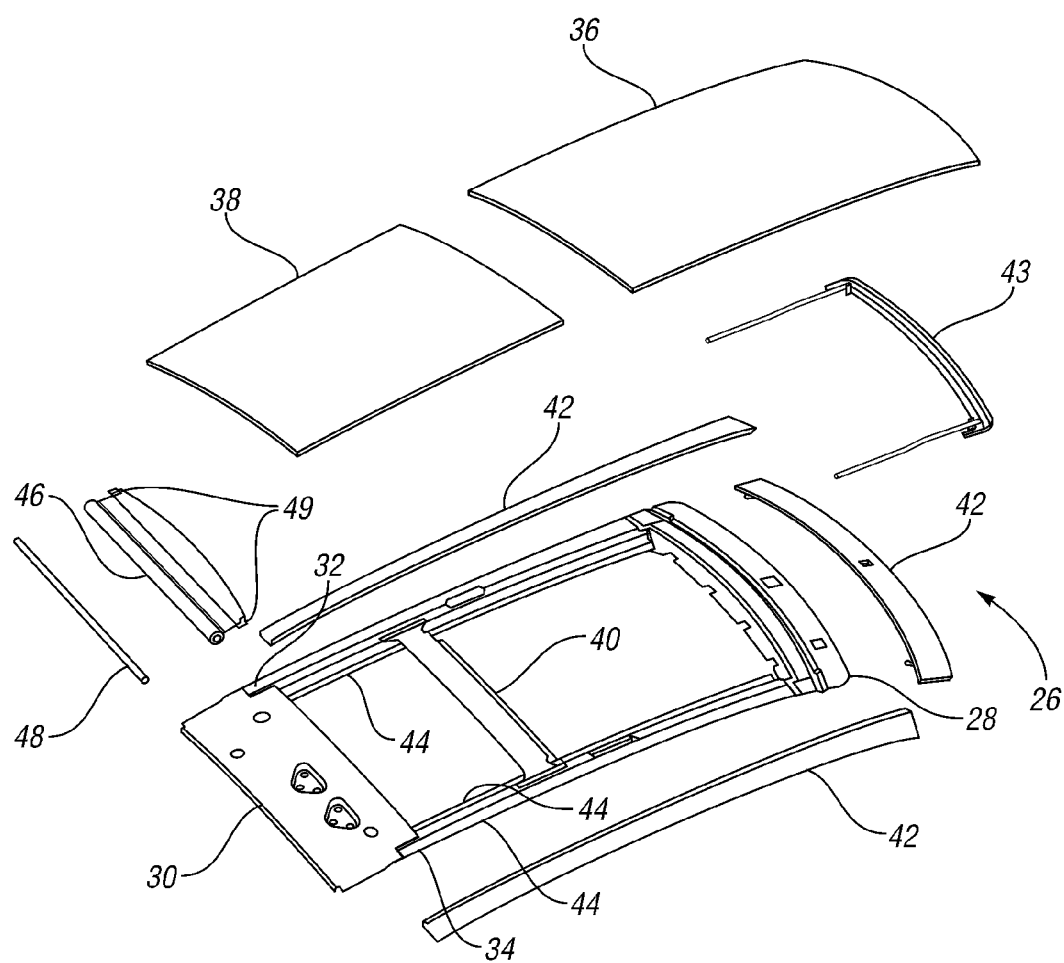
FIG. 3 is an exploded view of the roof module assembly of FIG. 1.

The roof module assembly 26 has a front cross member 28 and a rear cross member 30 as seen in FIG. 3 that each provide support and structure for the roof module assembly 26. In FIG. 1, the front cross member 28 and the rear cross member 30 covered by trim components 42. Under the trim components 42, the front cross member 28 is mounted to the vehicle body 22 near a front portion of the vehicle 20 and the rear cross member 30 is mounted on the vehicle body 22 towards a rear portion of the vehicle, which is opposite to the front portion.

The front cross member 28 and the rear cross member 30 can me made out of any suitable material. Non-limiting examples include aluminum and magnesium.

In prior art roof assemblies, the roof is generally formed out of steel, which is relatively high is weight in comparison to aluminum or magnesium. By stamping aluminum or magnesium for each of the front cross member 28 and the rear cross member 30, the overall weight for the roof module assembly 26 is decreased. Decreasing overall weight for the roof module assembly 26 allows for enhanced vehicle efficiency and performance.

Referring now to FIGS. 1-3, a first side rail 32 and a second side rail 34 are connected between the front cross member 28 and the rear cross member 30. Both the first side rail 32 and the second side rail 34 may be elongated along an entire upper side profile of the vehicle 20 between the front cross member 28 and the rear cross member 30. The first side rail 32 is mounted to the vehicle body 22 of the vehicle along a first lateral side 31 while the second side rail 34 is mounted to the vehicle body 22 of the vehicle 20 along a second lateral side 33, opposite the first side.

As illustrated, both the first side rail 32 and the second side rail 34 support a moveable front roof panel 36 and a stationary rear roof panel 38. Although two roof panels 36, 38 are illustrated, it is to be understood that any suitable quantity of roof panels 38 may be utilized within the scope of the present invention.

Referring again to FIG. 1, the front roof panel 36 and the rear roof panel 38 are at least partially transparent such that the occupant can see out of the panoramic roof module assembly 26. The front roof panel 36 and the rear roof panel 38 can be tinted to reduce visibility and manage heat. In at least one embodiment, depicted in FIG. 2, the front roof panel 36 and the rear roof panel 38 could be at least partially opaque so that light is not transmitted through the opaque region and the occupant cannot see out of the opaque region of the roof 24. The opaque region could be defined by ornamentation provided on the roof module assembly 26, or alternatively, the opaque region could encompass the entire roof panels 36, 38.

In at least one embodiment, the front roof panel 36 and the rear roof panel 38 are made out of a polycarbonate material that is transparent, as in FIG. 1. In another embodiment, the front roof panel 36 and the rear roof panel 38 are made out of a polycarbonate material that is at least partially opaque, as in FIG. 2. By employing a polycarbonate material for the front roof panel 36 and the rear roof panel 38, weight for the roof module assembly 26 is reduced when compared to roof assemblies utilizing glass. Additionally, utilization of polycarbonate permits molded shapes or contours to cost-effectively form the panels 36, 38. Of course, any suitable polymer, glass or other material for the front roof panel 36 and the rear roof panel 38 may be used within the scope of the multiple embodiments of the present invention.

As illustrated in FIG. 1, an intermediate cross member 40 is mounted to the first side rail 32 at one end and the second side rail 34 at the second end. The intermediate cross member 40 increases stability and rigidity of the roof module assembly 26 by supporting the front roof panel 36 and the rear roof panel 38. In at least one embodiment, the intermediate cross member 40 is stamped out of aluminum. In another embodiment, the intermediate cross member 40 is stamped out of magnesium. Alternatively, the intermediate cross member 40 can be extruded. Utilization of aluminum or magnesium in comparison to steel decreases the weight for the roof module assembly 26.

In FIGS. 1-3, trim components 42 may be mounted on the front cross member 28, the rear cross member 30, the first side rail 32, and the second side rail 34. The trim components 42 conceal the underlying structural members and provide a quality, Class-A finish for the vehicle 20 that is visually appealing. Additionally, the trim components 42 assist with water management.

The roof module assembly 26 utilizes fewer parts than prior art roof assemblies. Utilization of fewer parts results in weight reduction for the vehicle 20 and cost savings for the manufacturer. In one embodiment, a significant amount of parts and fasteners are eliminated when compared to prior art roof assemblies to manufacture the roof module assembly 26. Additionally, tolerance through the extruded side rails 32, 34 of the roof module assembly 26 is easily controlled. Furthermore, vehicle structural integrity is improved through utilization of the roof module assembly 26. In one embodiment, vehicle stiffness is increased by approximately five percent.

Figure 4:
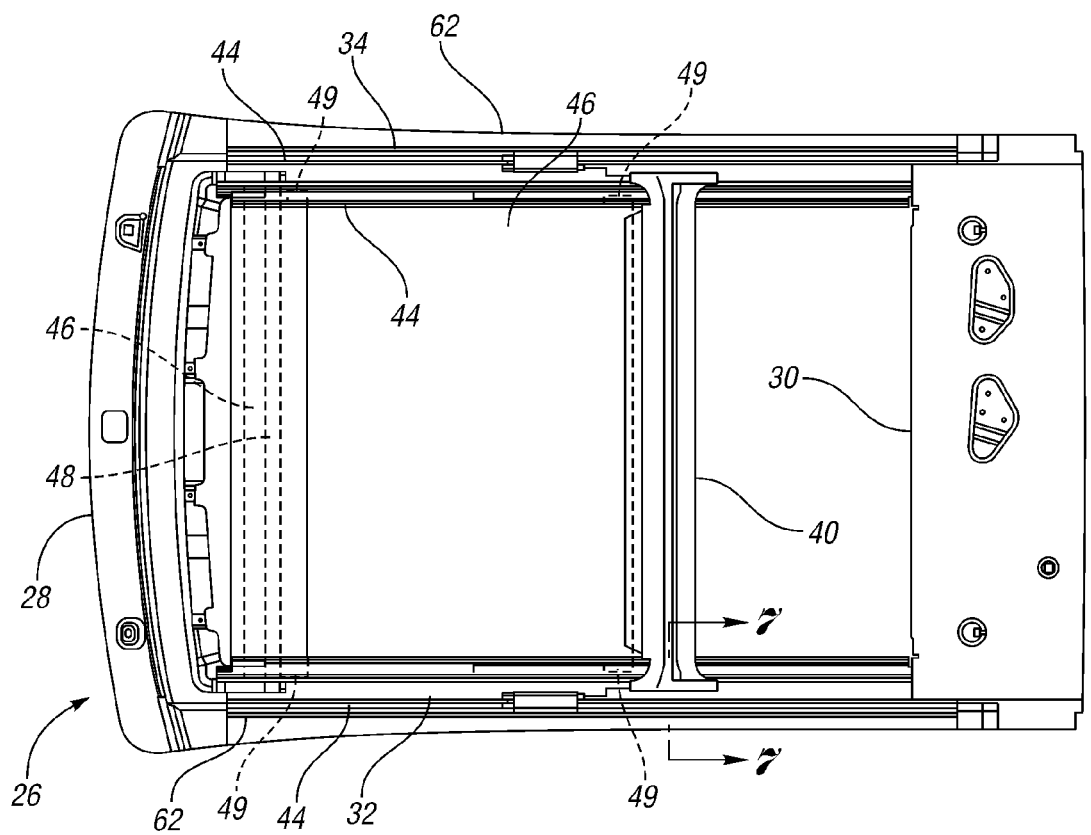
FIG. 4 is a top plan view of a portion of the roof module assembly of FIG. 1.
Figure 5:
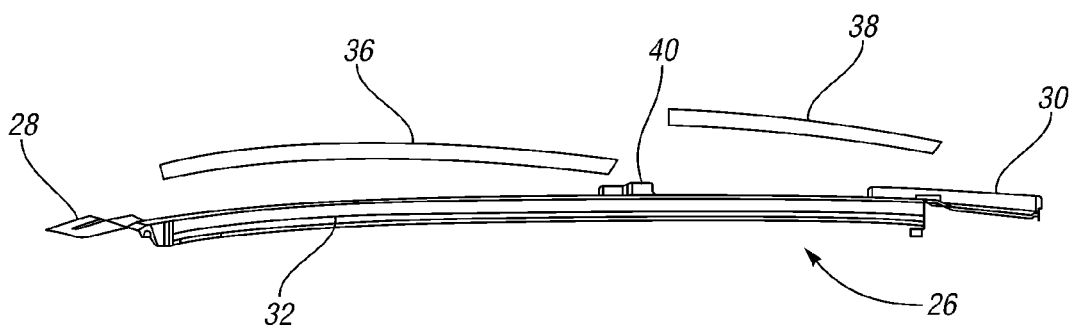
FIG. 5 is a partially exploded side elevation view of the portion of the roof module assembly of FIG. 4.

With reference to FIGS. 3-5, an embodiment of the roof module assembly 26 of FIG. 1 is depicted in greater detail with the trim components 42 removed. To manufacture the roof module assembly 26, the front cross member 28 and the rear cross member 30 are stamped out of a suitable material, such as aluminum or magnesium. In at least one embodiment, an intermediate cross member 40 is also stamped out of a suitable material to be assembled to the roof module assembly 26. The first side rail 32 and the second side rail 34 are extruded from aluminum or magnesium to include a plurality of tracks 44 formed therein. In at least one embodiment, mandrels can be employed during fabrication of the first and second side rails 32, 34 to prevent collapsing of the tracks 44 and other features, such as flanges, of the first and second side rails 32, 34. The first side rail 32 is mounted to the front cross member 28 and the rear cross member 42 and the second side rail is mounted to the front cross member 28 and the rear cross member 42. In at least one embodiment, the intermediate cross member 40 is mounted between the first and second side rails 32, 34.

In at least one embodiment, the first side rail 32 and the second side rail 34 are each welded to the front cross member 28 and the rear cross member 30. The first side rail 32 and the second side rail 34 may be friction stir welded to the front cross member 28 and the rear cross member 30. The first side rail 32 and the second side rail 34 can each be cold metal welded, laser welded, or mechanically fastened. In another embodiment, the first side rail 32 and the second side rail 34 are each adhesively bonded to the front cross member 28 and the rear cross member 30. Of course, any suitable manner of affixing the first side rail 32 and the second side rail 34 to the front cross member 28 and the rear cross member 30 is contemplated within the scope of the embodiments of the present invention. In addition, the intermediate cross member 40 can be affixed to each of the first side rail 32 and the second side rail 34 in a suitable manner, which include but is not limited to friction stir welding, adhesively bonding, cold metal welding, laser welding, or mechanically fastening.

As illustrated in FIG. 4, the roof module assembly 26 includes a sun shade member 46 that can be mounted to the first and second side rails 32, 34 in a suitable manner so that the sun shade member 46 can be manually or electrically extended or retracted, between a design position and a deployed position. In one embodiment, the sun shade member 46 is mounted directly to the first and second side rails 32, 34 with a fastener, such as a spring-loaded retainer. A tension bar 48 cooperates with the sun shade member 46 as the sun shade member 46 moves between the design position and the extended position. The tension bar 48 may be mounted proximate the sun shade member 46 to support the sun shade member 46 during movement to and from the design position. The tension bar 48 may be extruded from aluminum or magnesium or any other suitable material. The tension bar 48 aligns fabric of the sun shade member 46 with the side rails 32, 34 during movement between the design position and the extended position.

In one embodiment, guides 49 are mounted on the free end of the fabric of the sun shade member 46. The guides 49 can each be mounted within one of the tracks 44 of each of the side rails 32, 34. The guides 49 facilitate movement of the sun shade member 46 from the design position illustrated to the extended position. The sun shade member 46 can be either moved manually or driven by a motor from the design position to the extended position, which is discussed in further detail below.

In the depicted embodiment, the sun shade member 46 is a single sun shade member 46. Two separate sunshade members are not required, as is common in the prior art. Utilization of a single sun shade member 46 decreases the weight of the roof module assembly 26 and also decreases the cost of manufacturing the roof module assembly 26 because fewer components are needed.

As illustrated in FIG. 3, an air deflector 43 may be included in the roof module assembly 26. The air deflector 43 may be mounted in one of the plurality of tracks 44 provided in each of the first and second side rails 32, 34. The air deflector 43 is shown assembled to the roof module 26 and deploys upon opening of the front roof member 36 and retracts upon closing of front roof member 26. The air deflector 43 can be mounted within a track 44 on each of the first and second side rails 32, 34 in any suitable manner.

In FIG. 5, curvature of an embodiment of the portion of the roof module assembly 26 is shown. The depicted side rail 32 can be formed to have any desired curvature and length from front to back that corresponds with a curvature and length of the vehicle body. The roof panels 36, 38 are formed with a corresponding curvature.

In the depicted embodiment, the profile of the front cross member 28, the rear cross member 30 and the intermediate cross member 40 extends above the profile of the side rail 32. When the roof panels 36, 38 are mounted onto the components of the roof module assembly 26 illustrated, the roof panels 36, 38 have a profile extending above the profile of the side rail 32. The profile of the roof panels 36, 38 may form one continuous surface with each of the front cross member 28, the rear cross member 30 and the intermediate cross member 40.

Figure 6:
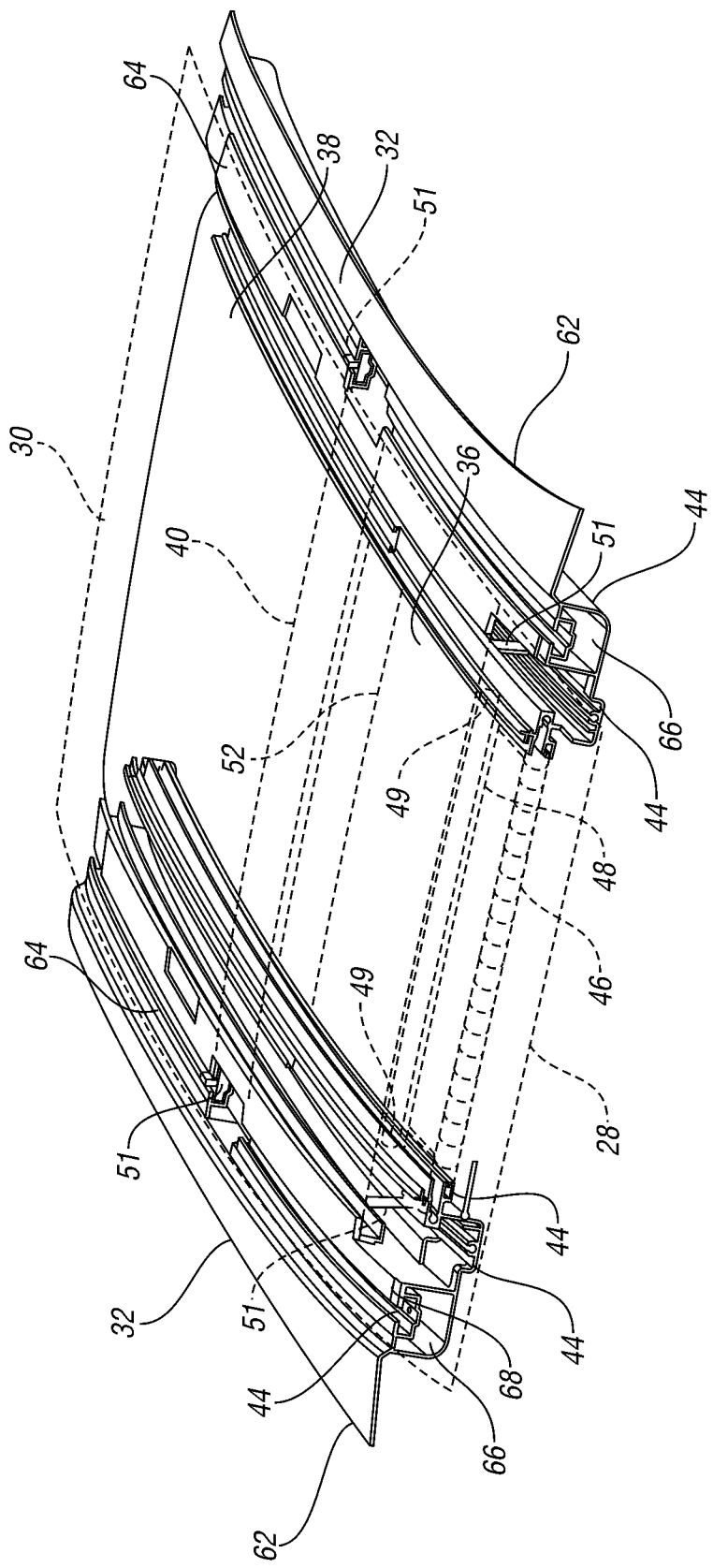
FIG. 6 is a perspective view of the portion of the roof module assembly of FIG. 4.

Referring now to FIG. 6, an embodiment of the side rails 32, 34 of the roof module assembly 26 of FIG. 3 is illustrated. As depicted, the side rails 32, 34 have an elongated profile with a generally consistent cross-section. After extrusion of each side rail 32, 34, portions may be removed from the side rails 32, 34 to facilitate installation of roof panels 36, 38 onto the side rails 32, 34.

In the illustrated embodiment, each side rail 32, 34 includes a plurality of tracks 44 integrally formed therein. The tracks 44 are formed as each side rail 32, 34 is extruded out of aluminum or magnesium to a desired length. The side rails 32, 34 can be formed to any length and can be formed to any curvature.

To mount the side rails 32, 34 to the vehicle body, support flanges 62 are provided on each side rail 32, 34. The support flanges 62 are integrally formed with each side rail 32, 34 when each side rail is extruded. The support flanges 62 facilitate assembly and mounting of the roof module assembly 26 to the vehicle body 20. A seal can be provided between the flanges 62 and the vehicle body 20 for sealing the connection of the roof module assembly 26 to the vehicle body 20.

In the illustrated embodiment, a lower intermediate cross member 52 is provided in additional to an upper intermediate cross member 40. The upper intermediate cross member 40 and the lower intermediate cross member 52 are each affixed to the side rails 32, 34 in a suitable manner, such as through welding or adhesive, as discussed above.

Figure 7:
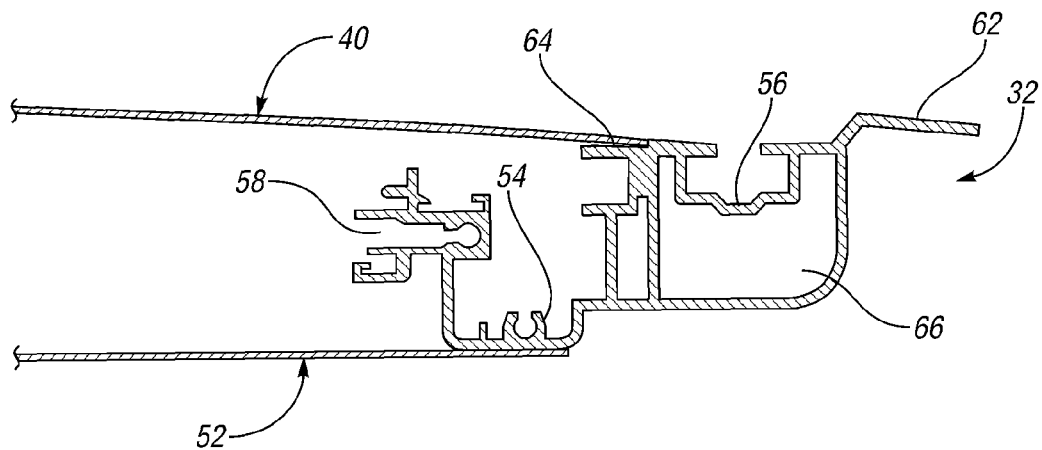
FIG. 7 is a cross-sectional view of FIG. 4 taken along the line 7-7.

In FIG. 7, a cross-sectional view of the portion of the roof module assembly 26 of FIG. 4 is illustrated, taken along the line 7-7. In the depicted embodiment, the upper intermediate cross member 40 is mounted to the each of the side rails 32, 34. The lower cross member 52 is mounted directly to each of the side rails 32, 34. Each of the front cross member 28 and the rear cross member 30 can be mounted to the side rails 32, 34, as illustrated in FIG. 6.

The upper intermediate cross member 40 interfaces with the front roof panel 36 and the rear roof panel 38 to provide further stability for the roof module assembly 26. The lower intermediate cross member 52 may be utilized for supporting a lower headliner attachment within the passenger compartment. Alternatively, the lower intermediate cross member 52 may provide structural support to the roof module assembly 26. The lower intermediate cross member 52 may be extruded or stamped out of aluminum or magnesium. Additionally, the upper intermediate cross member 40 may be formed during the manufacturing process in order to correspond to a pitch of the roof panels 32, 34 however small or great of a pitch desired.

Figure 8:
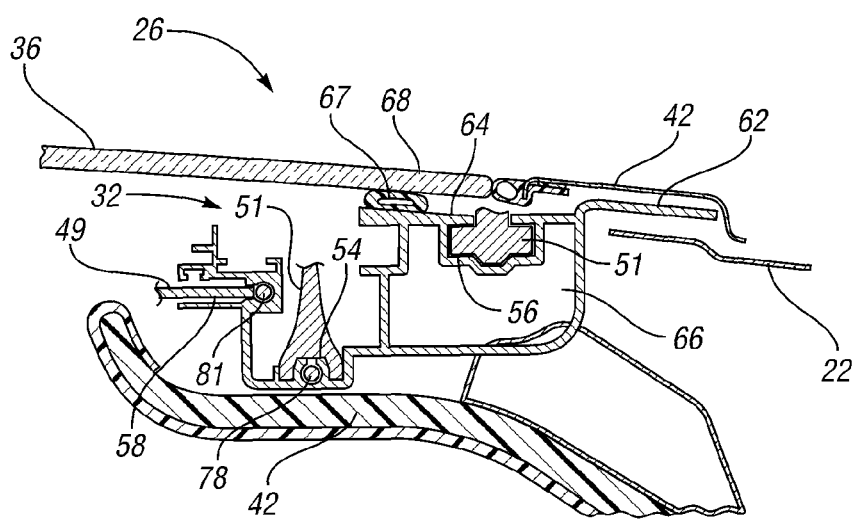
FIG. 8 is a cross-sectional view of a portion of the roof module assembly of FIG. 4.

In FIG. 8, a portion of an embodiment of the roof module assembly 26 of FIG. 3 is depicted. The first side rail 32 is illustrated but it is to be understood that the second side rail 34 would have the mirror image of the first side rail 32.

Figure 10:
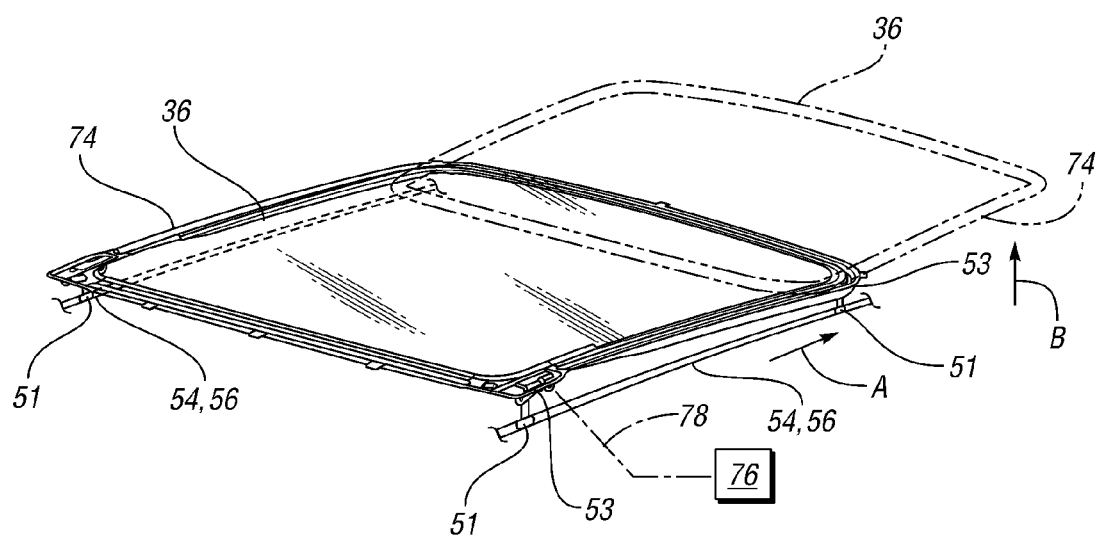
FIG. 10 is a perspective view a portion of the roof module assembly of FIG. 1 according to another embodiment.

The side rail 32 has a plurality of tracks 54, 56, 58. In one embodiment, a front integrated roof track 54 facilitates movement of the front roof panel 36 so that an opening is created when the front roof panel 36 is moved from a design position to an opened position (as seen in FIG. 10-11). The front integrated roof track 54 cooperates with a slider 51 that may be mounted to the roof panel 36 (as seen in FIGS. 10-11) in a suitable manner. The slider 51 can slide within the front integrated roof track 54 to move the roof panel 36. In at least one embodiment, the slider 51 is connected to an electrically powered drive gear unit, such as a motor driven gear unit, by a cable to move the slider 51 and thus, the roof panel 36 along the track 54.

In at least one embodiment, a rear integrated track 56 receives a slider 51 to support and facilitate movement of the front roof panel 36. The rear roof panel 38 of the depicted embodiment is stationary.

It is to be understood that the roof panels 36, 38 can each be moveable, stationary or any combination thereof within the spirit and scope of the present invention.

In another embodiment, another track 58 is provided within the side rail 32 to cooperate with the guides 49. The guides 49 are mounted to an end of the sun shade member 46 for movement of the sun shade member 46, as discussed above. The track 58 is an integrated sunshade track 58 and controls movement of the guides 49 as the guides 49 moves from the design position to the extended position and from the extended position to the design position. In at least one embodiment, the guides 49 are connected to an electrically powered drive gear unit, such as a motor driven gear unit, by a cable to move the guides 49 and thus, the sun shade member 46 along the track 58.

A primary seal 67 is provided on the flange 64. The front roof panel 36 compresses the seal 67 for sealing the opening. As illustrated, a secondary seal 68 is provided on the trim component 42 to manage and divert water from the side rail 32. In one embodiment, the secondary seal 68 is mounted to the trim component 42 with adhesive.

In at least one embodiment, a reservoir or liquid management cell 66 is integrally formed in the side rail 32. In at least one embodiment, the liquid management cell 66 has an end cap with an aperture provided therein to allow liquid to flow out of the side rail 32.

Figure 9:
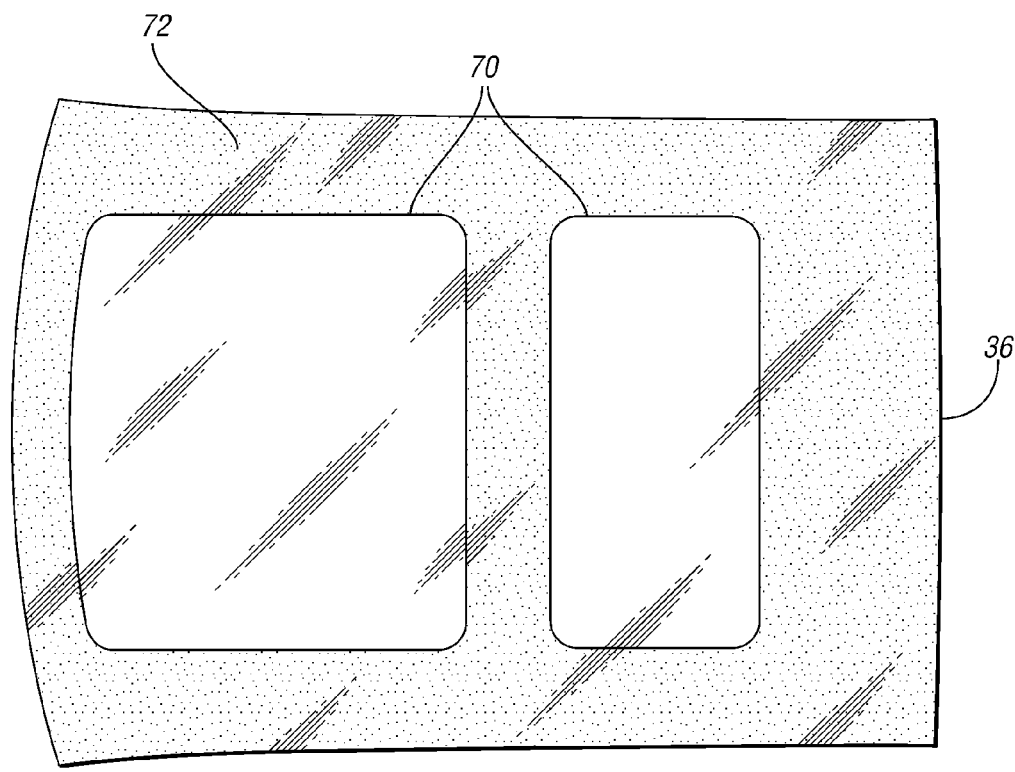
FIG. 9 is a top plan view of a roof panel in accordance with another embodiment of the present invention.

In at least one embodiment, only one roof panel 36 is supported by the side rails 32, 34. In FIG. 9, one roof panel 36 is formed to cover the entire roof surface so that only one roof panel 36 is needed. In the illustrated embodiment, the roof panel 36 has fixed transparent windows 70 and an opaque surface 72. To manufacture the roof panel 36 as illustrated, the opaque surface 72 is printed onto the transparent roof panel 36. In at least one embodiment, the roof panel 36 has molded-in color, which can be generally transparent or opaque. Alternatively, the different materials can be two-shot molded. The roof panel 36 may be formed out of polycarbonate, glass or any suitable material.

With reference now to FIGS. 10-11, an embodiment of a portion of the roof module assembly 26 of FIG. 1 is depicted. As illustrated, the roof panel 36 is provided with a frame 74. The frame 74 is formed to interface with the front roof panel 36. The frame 74 can be made out of any suitable material, as is known in the prior art.

The roof panel 36 is in the design position in solid. The slider 51 moves along the integrated track 54 and moves the roof panel 32 in a direction indicated by arrow A. A lifting mechanism 53 pivots the roof panel 32 in a direction indicated by arrow B. Collectively, the slider 51 and the lifting mechanism 53 move the roof panel to the extended position, as shown in phantom.

As illustrated, each of the slider 51 and the lifting mechanism 53 is connected to an electric motor 76 with a cable 78. When the motor 76 is activated, the slider 51 and the lifting mechanism 53 are each moved to force the roof panel 36 along the track 54 in the direction indicated by arrow A and to pivot open in the direction indicated by arrow B. Once the roof panel 36 is in the extended position, the motor 76 can be reversed to move the slider 51 and the lifting mechanism 53 to return to the design position. Any suitable motor 76 or electrically powered drive gear unit can be employed within the scope of the present invention.

In FIG. 12, the sun shade member 46 is depicted in connection with the guide 49 in the design position. As illustrated, the sun shade member 46 is mounted to the side rail 32 below the rear cross member 30 so that the sun shade member 46 is generally not visible to the occupant in the design position.

The material of the sun shade member 46 is attached to the guide 49. The guide 49 is mounted within track 58 so that the guide 49 can move along the track 58 in the direction indicated by arrow A to extend the sun shade member 46 to the extended position. In one embodiment, the arrow A is directed towards the rear of the vehicle. In another embodiment, the arrow A is towards the front of the vehicle.

The tension bar 48 is mounted to the side rails 32, 34 to align and prevent wrinkling of the material of the sun shade member 46, when the guide 49 moves between the retracted position and the extended position.

As illustrated, the guide 49 is connected to a motor 79 with cable 81. When the motor 79 is activated, the guide 49 is moved in the direction indicated by arrow A. When the sun shade member 46 and the guide 49 are in the extended position, the motor 79 can return the sun shade 46 to the retracted position. Any suitable motor 79 or electrically powered drive gear unit can be employed within the scope of the present invention.

In at least one embodiment, the sun shade member 46 includes a spring to bias the sun shade member 46 to pivot in a direction opposite the direction indicated by arrow A. When the guide 49 moves the sun shade member 46 from the extended position to the design position, the biasing member rotates the sun shade member 46 to recoil the material that was extended and return to the design position.

Figure 13:
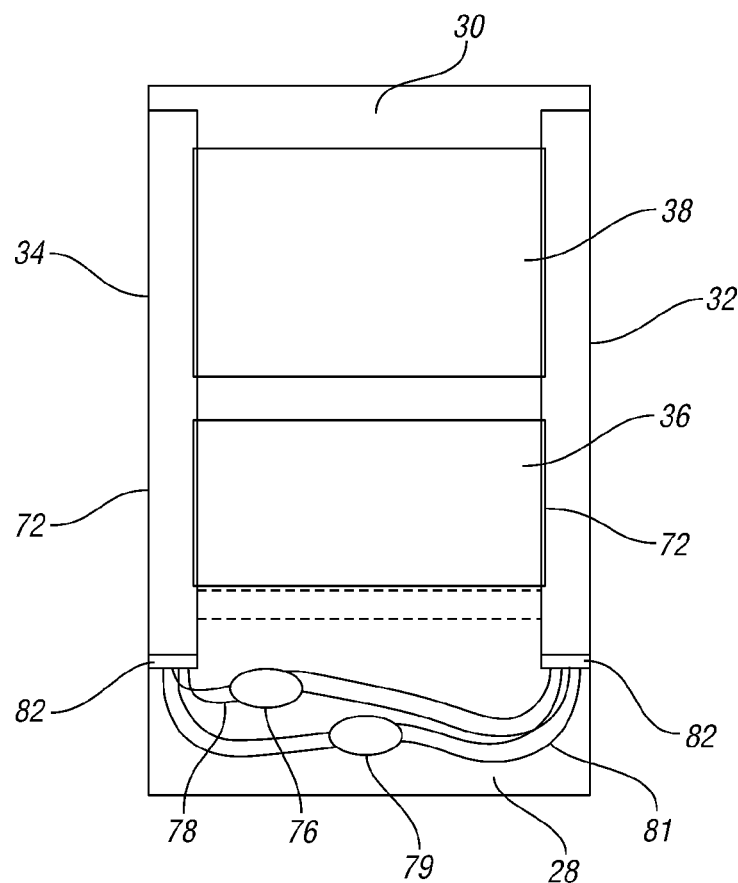
FIG. 13 is a top plan view of an embodiment of a roof module assembly.
Figure 14:
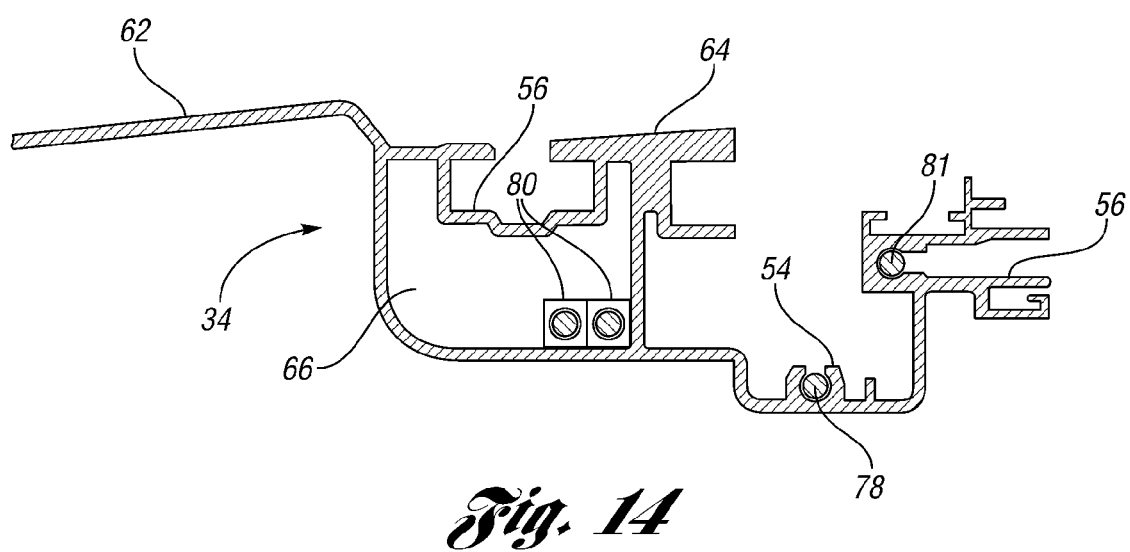
FIG. 14 is a cross-sectional view of the roof module assembly of FIG. 13.

Referring now to FIGS. 13 and 14, another embodiment of a roof module assembly 26 is illustrated. The roof module assembly 26 includes motors 76, 79 that are each connected to one of the front roof panel 36 and the sun shade member 46 with cables 78, 81. Although two motors 76, 79 are illustrated, any quantity of motors 76, 79 are contemplated within the scope of the present invention.

In the illustrated embodiment, the cables 78, 81 are mounted within each of the side rails 32, 34 in the integrally formed front roof track 54 and sun shade track 58. The return side for the cables 78, 81 are routed through integrally formed guides 80. The guides 80 are formed with each of the side rails 32, 34 when the side rails 32, 34 are manufactured through extrusion. Incorporation of the guides 80 into the main extruded side rail 34 eliminates a need for a separate return tube, assembly and routing of that return tube to the outside of the rail or roof module assembly 26. The side rail 34 provides protection for the return cable to minimize the possibility of damage to the return cable.

FIG. 14 further depicts the embodiment of the guides 80 formed on the inside of the side rail 34. A pair of guides 80 are illustrated for the return end of the cables 78, 81 from the motors 76, 79. The guides 80 are formed in the liquid management cell 66. The guides 80 may also be formed externally to the liquid management cell 66.

The end of the side rails 32, 34 are plugged with a sealed cap member 82. The sealed cap member 82 further protects cables 78, 81 from liquid and dirt. In at least one embodiment, a molded-in tube is provided from the motor 76, 79 to the end of the side rails 32, 34 to protect the cables 78, 81.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed:

1. A panoramic vehicle roof module assembly comprising:
    a front cross member adapted to be mounted to a vehicle body;
    a rear cross member adapted to be mounted to the vehicle body spaced apart from the front cross member;
    a first side rail mounted to a first end of the front cross member and to a first end of the rear cross member, the first side rail having a plurality of integrated tracks and an integrated support flange adapted to mount the vehicle roof module assembly to the vehicle body, the tracks and the flange being provided along an entire length of the first side rail;
    a second side rail mounted to a second end of the front cross member and to a second end of the rear cross member, the second side rail having a plurality of integrated tracks and an integrated support flange adapted to mount the vehicle roof module assembly to the vehicle body, the tracks and the flange being provided along an entire length of the second side rail;
    an intermediate cross member having a first end mounted to the first side rail and a second end mounted to the second side rail between the front cross member and the rear cross member;
    a first generally transparent roof panel mounted to the first side rail and the second side rail to interface with the front cross member and the intermediate cross member;
    a second generally transparent roof panel mounted to the first side rail and the second side rail to interface with the rear cross member and the intermediate cross member;
    wherein the intermediate cross member further comprises:
    an upper support cross member mounted to an upper portion of each of the first and second side rails; and
    a lower support cross member mounted to a lower portion of each of the first and second side rails.

2. The panoramic vehicle roof module assembly of claim 1 wherein the first generally transparent roof panel is further defined as a first polycarbonate roof panel and the second generally transparent roof panel is further defined as a second polycarbonate roof panel.

3. The panoramic vehicle roof module assembly of claim 1 further comprising:
    a sun shade member mounted to each of the first side rail and the second side rail; and
    a guide mounted within one of the plurality of tracks to guide the sun shade member between a design position and an extended position.

4. The panoramic vehicle roof module assembly of claim 1 wherein each of the plurality of tracks of the first side rail and the second side rail further comprises an integrated roof track to facilitate movement of one of the first generally transparent roof panel and the second generally transparent roof panel.

5. The panoramic vehicle roof module assembly of claim 1 wherein each of the first side rail and the second side rail further comprises a sealing flange sized to seal at least one of the first generally transparent roof panel and the second generally transparent roof panel.

6. The panoramic vehicle roof module assembly of claim 1 further comprising:
    a seal mounted between the side rail and each of the first transparent roof panel and the second transparent roof panel; and
    a trim member supported by the first side rail with a secondary seal.

7. The panoramic vehicle roof module assembly of claim 1 further comprising a front roof frame sized to receive the first generally transparent roof panel such that the front roof frame is supported by the first side rail and the second side rail, and interfaces the front cross member and the intermediate cross member, wherein the first generally transparent roof panel is moveable relative to the first side rail, the second side rail, the front cross member and intermediate cross member.

8. A panoramic vehicle roof module assembly comprising:
    a front cross member and a rear cross member, each adapted to be mounted to a vehicle body at spaced apart locations;
    a first extruded side rail and a second extruded side rail, each mounted to the front and rear cross members at spaced apart locations, each side rail having a front integrated roof track, a rear integrated roof track and an integrated sun shade track, each track formed therein along a length thereof;
    at least one roof panel supported by one of the integrated roof tracks of the side rails to interface with at least one of the cross members; and
    an intermediate cross member having a first end mounted to the first side rail and a second end mounted to the second side rail between the front cross member and the rear cross member;
    wherein the intermediate cross member further comprises:
    an upper support cross member mounted to an upper portion of each of the first and second side rails; and
    a lower support cross member mounted to a lower portion of each of the first and second side rails.

9. The panoramic vehicle roof module assembly of claim 8 further comprising a sun shade supported by the sun shade track and moving independently of the at least one roof panel.

10. The panoramic vehicle roof module assembly of claim 8 further comprising a sun shade supported by the sun shade track and moving independently of the at least one roof panel.

11. The panoramic vehicle roof module assembly of claim 1 further comprising a sun shade supported by the sun shade track and moving independently of the at least one roof panel.

* * * * *